United States Patent [19]

Schuler

[11] 4,379,578
[45] Apr. 12, 1983

[54] REUSABLE BOTTLE HOLDER

[76] Inventor: Heriberto Schuler, P.O. Box 1553, Casselberry, Fla. 32707

[21] Appl. No.: 246,084

[22] Filed: Mar. 20, 1981

Related U.S. Application Data

[63] Continuation-in-part of Ser. No. 126,455, Mar. 3, 1980, abandoned.

[51] Int. Cl.³ .............................................. B65D 23/10
[52] U.S. Cl. ............................... 294/31.2; 215/100 A; 294/33
[58] Field of Search .................... 294/27 R, 27 H, 29, 294/31 R, 31 A, 31.2, 32, 33, 87.2, 87.28, 99 R, 145, 148, 164–166; 16/114 R, 114 A; 215/100 R, 100 A, 101; 220/85 H, 94–96; 222/465, 467; 248/145.6, 311.2, 311.3, 312, 312.1

[56] References Cited

U.S. PATENT DOCUMENTS

| | | | |
|---|---|---|---|
| 1,825,897 | 10/1931 | Brooke | 294/31.2 |
| 3,021,026 | 2/1962 | Clare | 294/27 R X |
| 3,177,025 | 4/1965 | Short | 294/33 |
| 3,285,410 | 11/1966 | Brunsing | 294/87.28 X |
| 3,794,370 | 2/1974 | Lockhart et al. | 294/31.2 |

FOREIGN PATENT DOCUMENTS 919799  2/1963  United Kingdom ........... 215/100 A

Primary Examiner—Johnny D. Cherry
Attorney, Agent, or Firm—Duckworth, Allen, Dyer & Pettis

[57] ABSTRACT

A reusable bottle holder is disclosed adapted to be used in connection with bottles now commonly used for soft drinks such as the two liter bottles that have a flange like projection at the neck of the bottle. The bottle holder has a locking portion adapted to cooperate with the flange like projection of the bottle in order to provide a secure friction fit for the handle.

5 Claims, 10 Drawing Figures

U.S. Patent  Apr. 12, 1983  Sheet 1 of 2  4,379,578
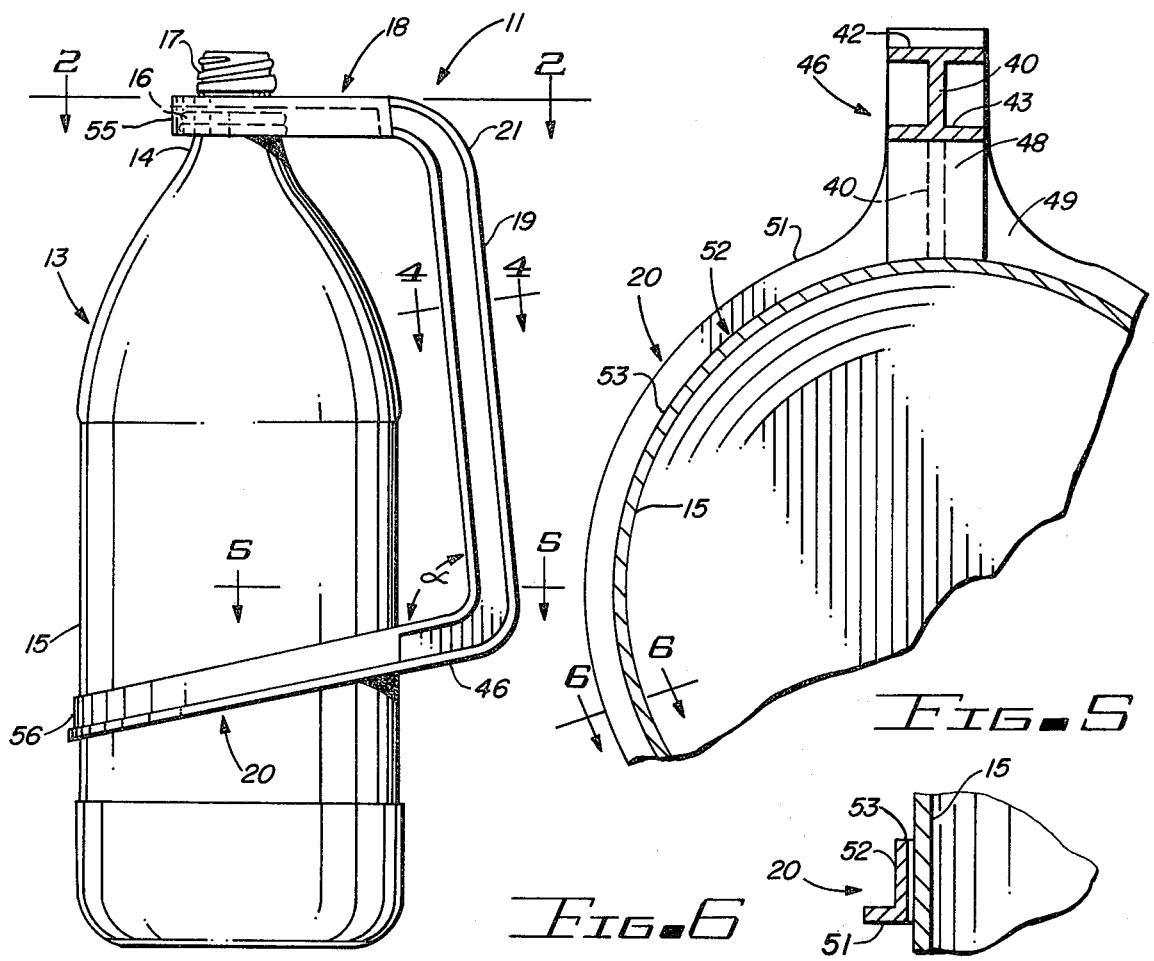
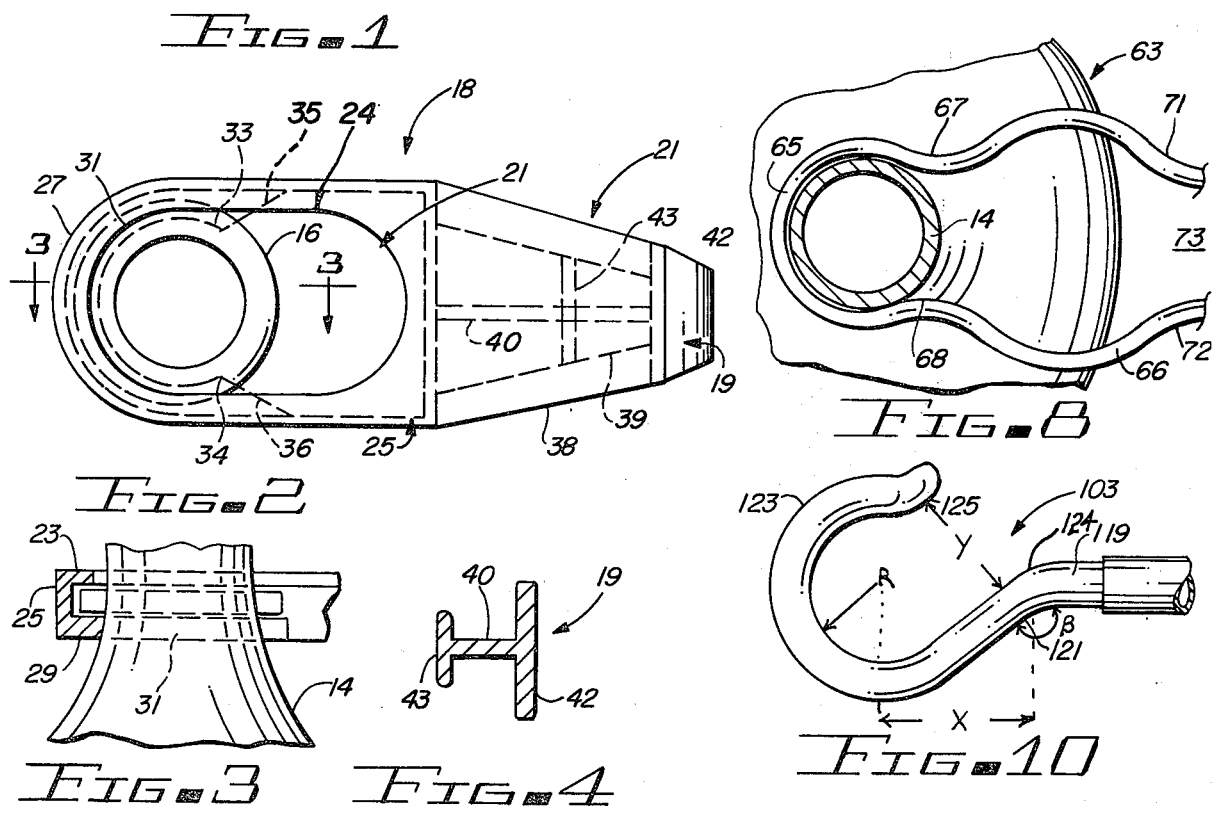

REUSABLE BOTTLE HOLDER

This application is a continuation-in-part of U.S. patent application, Ser. No. 126,455, filed on Mar. 3, 1980, now abandoned.

BACKGROUND OF THE INVENTION

The invention pertains to holders for containers in general and more specifically to a reusable bottle holder to be used in connection with bottles having a flange like member in the neck portion of the bottle.

Soft drink manufacturers have introduced larger size bottles as an economy measure both from the point of view of the manufacturer and the consumer. These bottles, typically two liter bottles, are made of plastic or glass and are usually of such a large exterior diameter that handling of the bottles is somewhat inconvenient, particularly for children who sometimes lack the coordination to securely hold the bottles with two hands while pouring the content and replacing the bottle in the refrigerator. The new type of bottle typically has a flange like member near the neck of the bottle. Typically, the bottle is filled with the contents and then passes to a station where an aluminum cap which is initially smooth, i.e. having no threads, is crimped on to the threaded portion of the neck of the bottle thereby forming the threads directly on the cap by the crimping action. In order to facilitate this operation the new two liter bottles are provided with a flange like member for strengthing purposes, among others.

BRIEF SUMMARY OF THE INVENTION

In order to facilitate the handling of the large capacity bottles a reusable holder is disclosed having a handle portion, a locking portion adapted to engage the neck portion of the bottle in a friction fit and adapted to cooperate with a flange like portion of the neck of the bottle to provide a secure fit for the holder. The holder is provided with a body support portion adapted to be inserted about the lower body portion of the bottle in a friction fit. The locking portion is provided with two projections separated by a distance which is less than the diameter of the neck of the bottle, and which defines two regions, one which is approximately the same size as the neck of the bottle and the second which is slightly larger than the diameter of the flange like member. In operation, the locking member is inserted over the top of the neck of the bottle so that the second region is on top of the flange like member and the locking portion is then forced downwards past the flange like member. At that point the locking portion is displaced so that the two projections engage the neck of the bottle and due to pulling action yield and allow which the neck of the bottle to enter into the first region which then secures the neck of the bottle by friction.

The invention has the advantages that a simple integral reusable holder can be provided for these awkward large bottles of soft drinks.

BRIEF DESCRIPTION OF THE DRAWINGS

Further details are explained below with the help of the examples illustrated in the attached drawings in which:

FIG. 1 is an overall view of the reusable bottle holder according to the present invention;

FIG. 2 is a cross section through 2—2 of FIG. 1;

FIG. 3 is a cross section through 3—3 of FIG. 2;

FIG. 4 is a cross section through 4—4 of FIG. 1;

FIG. 5 is a cross section through 5—5 of FIG. 1;

FIG. 6 is a cross section through 6—6 of FIG. 5;

FIG. 8 is a cross section through 8—8 of FIG. 7;

FIG. 10 is a detail top view of the locking portion of the embodiment of FIG. 9.

DESCRIPTION OF THE PREFERRED EMBODIMENT

Figure 7:
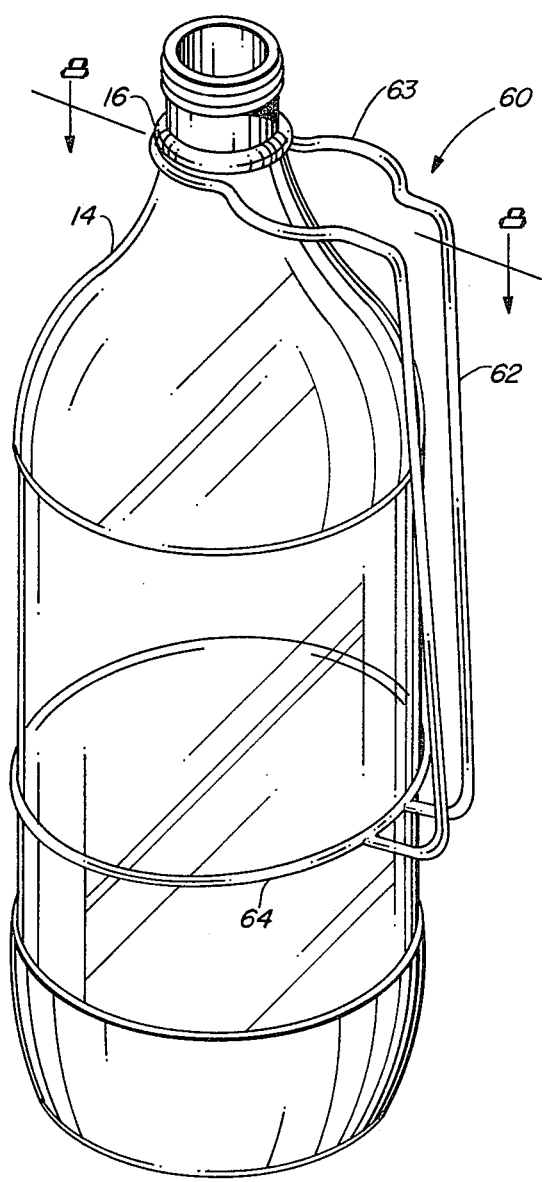
FIG. 7 is an alternative embodiment of the reusable bottle holder of the invention.

In FIG. 1, a reusable bottle holder 11 adapted to be used with a bottle 13 is shown. The type of the bottle to be used is the new large capacity bottles now popular among soft drink manufacturers usually having a capacity of two liters. Typically, the bottle has a neck 14 and a body portion 15, where the body portion 15 is of substantially larger diameter than the neck portion 14. This type of bottle usually has a flange like member or neck flange 16 in the neck 14 just below the threaded portion 17 of the bottle 13.

The reusable bottle holder 11 has a locking portion 18, a handle portion 19, and a body support portion 20. A transition portion 21 is provided for the transition between the locking portion 18 and the handle portion 19.

As shown in FIG. 2, the locking portion 18 has a top portion 23 having an aperture 24 with a width which is slightly larger than the width of the neck 14 and the threaded portion 17 of the bottle 13. The locking portion 18 is provided with a side wall 25 (better shown in FIG. 3) which has a width that is slightly larger than the width of the neck flange 16. The locking portion 18 has a rounded end 27 and a bottom portion 29. The bottom portion 29 has a semi-annular first section 31 with a central angle which is larger than one hundred eighty degrees (180°). The semi-annular first section 31 ends at projections 33 and 34 which are separated from each other by a distance which is less than the diameter of the neck 14 of the bottle just below the neck flange 16. The projections 33 and 34 have angular sections 35 and 36 respectively which taper outwardly towards the side wall 25 to provide a gentle channeling slope for the neck 14 of the bottle 13. As can be seen from FIG. 2, the angular sections 35 and 36 merge into side wall 25 at opposite points which are disposed a distance which is slightly larger than the diameter of the neck flange 16. The bottom portion 29 of the locking portion 18 thus defines two regions separated by the projections 33 and 34. The first region, that defined by the semi-annular first section 31, has an area with an effective diameter approximately the same as the diameter of the neck of the bottle 14 immediately below the neck flange 16, but is smaller than the diameter of the neck flange 16. The second region is provided having an effective diameter which is larger than the diameter of the neck flange 16. The angle which is greater than one hundred eighty degrees (180°) and defines the location of the projections 33 and 34 depends on the material to be used in forming the bottle holder 11, as in operation, projections 33 and 34 must yield in order to allow the introduction of the neck of the bottle 14. If the locking portion is made of yieldable plastic the angle may be larger than if it is made of more rigid plastic, or of metal, or the like.

The locking portion 18 locks on the neck 14 of the bottle 13 and secures it by friction, and as shown in FIG. 3, the top portion 23 and bottom portion 29 cooperate with the neck flange 16 to prevent any twisting motion of the bottle 13 thereby providing a secure grip on the bottle under all circumstances. The locking portion 18 when engaged also prevents the holder 11 from sliding on the bottle 13.

The transition portion 21 is essentially a tapered I beam which curves and merges into the handle portion 19. The transition portion is provided with a tapering curved upper transition portion 38 and a tapering curved lower transition portion 39 connected by a central rib 40. The central rib 40 curves and becomes the central rib of the handle portion 19. As shown in FIG. 4, the handle portion 19 has an I beam cross section with the central rib 40, and an exterior cross member 42 and an interior cross member 43. Desirably the exterior cross member 42 is of slightly larger width than the interior cross member 43 in order to provide a more comfortable grip. The I beam cross section is provided for structural integrity and rigidity.

A second transition section 46 is provided, as shown in FIG. 5, to connect the handle portion 19 with the body support portion 20. The second transition has an upper portion 48 which is a continuation of the interior cross member 43 and a lower portion 49 which is a continuation of the exterior cross member 42 and which tapers outwardly to form an outward horizontal projection 51 of the body support member 20. Body support member 20 has the shape of a cylindrical or tubular section with a cylindrical diameter, i.e. measured at 90° from the longitudinal axis of the cylindrical section, that is approximately the same as the diameter of the body 15 of the bottle 13. Shown better in FIG. 6, the body support member 20 has an L-shaped cross section with the outward horizontal projection 51 and a vertical portion 52 which is a continuation of the rib 40. A slight friction clearance 53 is provided between the vertical portion 52 and the body 15 of the bottle 13.

Referring back to FIG. 1, it should be noted that desirably the distance between the outward point 55 of the locking portion 18 and the outward point 56 of the body support portion 20 should be as large as possible in order to accomodate the center of gravity of the contents of the bottle 13 as it is emptied. The desired separation may be achieved by disposing the body support portion 20 at an angle from the handle portion 19 with the angle typically being greater than ninety degrees (90°). While this angular displacement is desired for easier handling, it is not required as the locking portion 18 provides a sufficient grip on the bottle 13 so that even sloshing action of a partially empty bottle will not disengage the reusable bottle holder 11 from the bottle 13.

The bottle holder is used by first inserting the neck 14 of the bottle 13 through the body support portion 20. The outward horizontal projection 51 of the bottle support member 20 provides a grip for pushing the body support member 20 downwardly to engage the body 15 of the bottle 13. As the reusable bottle holder 11 is pushed downwardly on the bottle, pressure is applied on the handle portion 19 to push it towards the bottle 13 so that the threaded portion 17 of the bottle 13, the neck flange 16 and the neck 14 of the bottle 13 can be guided into the second region of locking portion 18. As the reusable bottle holder 11 is pushed downwardly the neck flange 16 will come to rest upon the top portion 23 of the locking portion 18, while the threaded portion 17 of the bottle will protrude from aperture 24. At this point the neck flange 16 and neck 14 of the bottle 13 are positioned in the second region. In order to lock the reusable bottle holder the user then pulls handle 19 away from the bottle 13 thereby forcing the neck 14 of the bottle 13 to yieldably displace the projections 33 and 34 until the neck 14 is in the first region defined by the semi-annular first section 31.

As shown in FIG. 7 in an alternative embodiment of a bottle holder 60 having a handle portion 62, a locking portion 63 and a support portion 64. The support portion 64 and handle portion 62 may be formed substantially the same as in the embodiment of FIG. 1, or preferably should be made of wire which may be surrounded by a protective coating, for example rubber, thereby obviating the need of an I beam construction. As can be seen in FIG. 8, the locking portion 63 is provided with a first semi-circular aperture 65 which is substantially the same diameter as the neck 14 of the bottle 13 and a second semi-circular aperture 66 having a diameter larger than the diameter of the neck flange 16. The apertures 65 and 66 are contiguous and are separated by yieldable projections 67 and 68. The semi-circular apertures 65 and 66 are disposed so that the distance between their centers is greater than the radius of aperture 66 and more than the sum of the radii of apertures 65 and 66. In this embodiment the locking portion is manipulated so that the threaded portion 17 of the bottle 13 and the neck flange 16 are passed through the second semi-circular aperture 66 and the locking portion is then pulled so that the neck 14 of the bottle 13 yieldable displaces the yieldable projections 67 and 68 and passes through to the first semi-circular aperture 65 thereby resulting in a friction fit wherein the locking portion 63 cooperates with the neck flange 16 to further secure the grip on the bottle. It should be noted that the locking portion 63 is preferably made of wire material and is not connected at the base. Instead, the ends 71 and 72 of the wire are bent downwards and form handle portion 62. The reason for not connecting ends 71 and 72 at the base 73 is that it will result in a more resilient or spring locking portion, which is desirable to avoid damaging a plastic bottle.

It is, of course, understood that the bottle holder 11 can be integrally formed of any material, for example metal, wood, plastics, etc., or alternatively may be formed in separate sections which are later connected together. Alternatively, different materials may be used for different sections depending on economic advantages to be gained from such combinations. As can be appreciated by the detailed description the reusable bottle holder 11 can be inserted while the bottle 13 is capped or uncapped.

Additionally, while the bottle holder 60 is described in conjunction with a bottle 13 having a neck flange 16, the holder 60 can be used with any necked bottle, with or without the flange.

Figure 9:
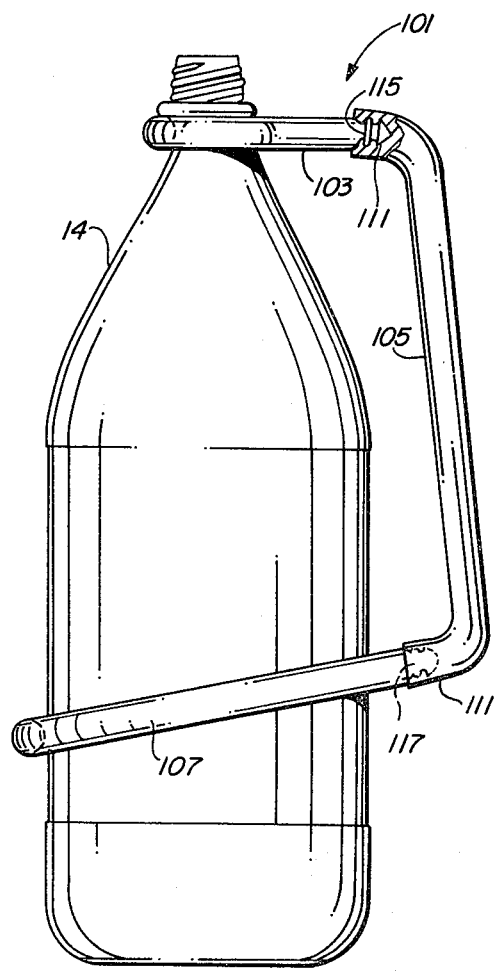
FIG. 9 is an alternative embodiment of the reusable bottle holder of the invention.

Illustrated in FIGS. 9 and 10 is yet another embodiment of a bottle holder 101. In this embodiment the bottle holder 101 is provided with a locking portion 103, a handle portion 105 and a body support portion 107. The bottle holder 101 may be made of any material although this embodiment is particularly adapted for molding in plastics. Handle portion 105 may be a single piece molded in plastic having a female fitting 111. The female fitting 111 may be an internally threaded aperture, or it may be any other type of aperture that will result in a strong connection with body support portions 107 and locking portion 103. Locking portion 103 is provided with a suitable male projection 115 to engage female fitting 111, and similarly body support portion 107 may be provided with male projection 117. The body portion 107 is a molded member of annular shape and is completely closed. As shown in FIG. 10, locking portion 103 includes a first straight section 119, a second straight section 121 disposed an angle Beta from the first straight section 119, and a semi-circular section 123 of internal radius R, disposed a distance X from the joint 124 between the first and second straight sections 119 and 121. The semi-circular section 123 is terminated at an end point 125 which is a distance Y from the joint 124. The parameters Beta, R, X and Y vary depending on the size of the bottle to be accomodated by the locking portion 103. For example, for a large bottle the approximate values are Beta=138°; R=18 mm.; Y=30 mm.; and X=35 mm. For a smaller bottle, the approximate measurements are Beta=148°; Y=21 mm.; X=35 mm.; and R=13.5 mm. The value of R is picked to be approximately equal to the neck diameter of the bottle.

I claim:

1. A reusable bottle holder adapted to be used with a necked bottle having a neck flange comprising:
   a handle member; and
   means connected to the handle member for securing the neck of the bottle having a top member having an aperture with a width greater than the width of the neck of the bottle immediately above the neck flange; a side wall connected to the perimeter of said top member having a width greater than the width of the neck flange; and a bottom member connected to the side wall, and having a semi-annular first section with a central angle greater than one hundred eighty degrees (180°) and terminating in a pair of projections disposed a distance less than the diameter of the neck of the bottle immediately below the flange, from each other, and an angular section gently sloping from the respective projections to the side wall, said semi-annular first section having a radius which is approximately the same as the radius of the neck of the bottle immediately below the neck flange.

2. An apparatus in accordance with claim 1 wherein said reusable bottle holder is integrally formed.

3. An apparatus in accordance with claim 1 wherein said handle member comprises a rib member, an outer cross member attached to one end of said rib member, and an inner cross member attached to the other end of said rib member, said inner cross member having a width which is less than the width of the outer cross member thereby providing an easier grip.

4. The apparatus of claim 1 further comprising:
   means connected to one end of said handle member for frictionally securing the body of the bottle.

5. An apparatus in accordance with claim 4 wherein said means for frictionally securing the body of the bottle comprises a cylindrical section having an L-shaped cross section, said cylindrical section having a cylindrical diameter that is approximately the same as the diameter of the body of the bottle.

* * * * *